United States Patent [19]
Molnar et al.

[11] Patent Number: 5,907,809
[45] Date of Patent: May 25, 1999

[54] POSITION DETERMINATION USING MULTIPLE BASE STATION SIGNALS

[75] Inventors: Karl Molnar; Rajaram Ramesh; Amer Aref Hassan; Barbara Molnar, all of Cary, N.C.

[73] Assignee: Ericsson Inc., Research Triangle Park, N.C.

[21] Appl. No.: 08/710,761

[22] Filed: Sep. 20, 1996

Related U.S. Application Data

[63] Continuation-in-part of application No. 08/597,073, Feb. 5, 1996, which is a continuation-in-part of application No. 08/179,958, Jan. 11, 1994, abandoned, and application No. 08/179,953, Jan. 11, 1994, Pat. No. 5,619,503.

[51] Int. Cl.$^6$ .............................. H04B 7/26; G01S 5/02; G01S 3/72
[52] U.S. Cl. ........................... 455/456; 342/357
[58] Field of Search .................... 455/405, 414, 455/422, 436, 440, 445, 456, 457; 342/357

[56] References Cited

U.S. PATENT DOCUMENTS

| | | | |
|---|---|---|---|
| 3,917,998 | 11/1975 | Welti | 455/13.1 |
| 4,450,582 | 5/1984 | Russell | 455/12.1 |
| 4,527,284 | 7/1985 | Rottger | 455/436 |
| 4,613,990 | 9/1986 | Halpern | 455/522 |
| 4,972,456 | 11/1990 | Kaczmarek et al. | 455/436 |
| 5,073,900 | 12/1991 | Mallinckrodt | 370/320 |
| 5,081,703 | 1/1992 | Lee | 455/13.1 |
| 5,111,534 | 5/1992 | Benner | 455/447 |
| 5,119,504 | 6/1992 | Durboraw, III | 455/575 |
| 5,151,919 | 9/1992 | Dent | 370/209 |
| 5,161,248 | 11/1992 | Bertiger et al. | 455/17 |
| 5,187,805 | 2/1993 | Bertiger et al. | 455/430 |
| 5,191,594 | 3/1993 | Argo et al. | 375/200 |
| 5,208,756 | 5/1993 | Song | 701/207 |
| 5,218,619 | 6/1993 | Dent | 370/209 |
| 5,249,181 | 9/1993 | Wang et al. | 370/347 |
| 5,287,541 | 2/1994 | Davis et al. | 455/12.1 |
| 5,303,286 | 4/1994 | Wiedeman | 455/428 |
| 5,303,393 | 4/1994 | Noreen et al. | 455/3.2 |
| 5,313,457 | 5/1994 | Hosletter et al. | 370/320 |
| 5,335,246 | 8/1994 | Yokev et al. | 455/456 |
| 5,339,330 | 8/1994 | Mallinckrodt | 370/320 |
| 5,343,512 | 8/1994 | Wang et al. | 455/410 |
| 5,363,428 | 11/1994 | Nagashima | 455/452 |
| 5,369,681 | 11/1994 | Boudreau et al. | 455/456 |
| 5,400,392 | 3/1995 | Nagashima et al. | 455/456 |
| 5,408,237 | 4/1995 | Patterson et al. | 342/354 |
| 5,483,664 | 1/1996 | Moritz et al. | 455/428 |
| 5,526,404 | 6/1996 | Wiedeman et al. | 455/430 |
| 5,528,247 | 6/1996 | Nonami | 342/357 |
| 5,535,432 | 7/1996 | Dent | 455/77 |
| 5,539,395 | 7/1996 | Buss et al. | 340/827 |
| 5,543,813 | 8/1996 | Araki et al. | 342/357 |
| 5,552,798 | 9/1996 | Dietrich et al. | 343/893 |
| 5,619,525 | 4/1997 | Wiedeman et al. | 375/200 |
| 5,666,662 | 9/1997 | Shibuya | 455/456 |
| 5,675,344 | 10/1997 | Tong et al. | 455/456 |
| 5,724,660 | 3/1998 | Kauser et al. | 455/456 |
| 5,732,354 | 3/1998 | MacDonald | 455/456 |

FOREIGN PATENT DOCUMENTS

| | | |
|---|---|---|
| 470272 | 2/1992 | European Pat. Off. |
| 501706 | 9/1992 | European Pat. Off. |
| 536921 | 4/1993 | European Pat. Off. |
| 0 562 374 | 9/1993 | European Pat. Off. |
| 662758 | 7/1995 | European Pat. Off. |
| 698 972 | 2/1996 | European Pat. Off. |
| 748 065 | 12/1996 | European Pat. Off. |
| 43 21 418 | 1/1995 | Germany . |
| 43 21 909 | 3/1995 | Germany . |
| WO93/23965 | 11/1993 | WIPO . |
| WO95/14936 | 6/1995 | WIPO . |
| WO96/21332 | 7/1996 | WIPO . |

OTHER PUBLICATIONS

"MSAT and Cellular Hybrid Networking," P.W. Baranowsky, *Proceedings of the Third International Mobile Satellite Conference*, pp. 149–154, Jan. 1, 1993 (Abstract Only).

"Architecture of an Integrated GSM–Satellite System," F.D. Priscoli, *European Transactions on Telecommunications*, vol. 5, No. 5, Sep.–Oct., 1994, pp. 91–99.

"Basic Array Theory", Wolfgana H. Kummer, Life Fellow, *Proceedings of the IEEE*, vol. 80, No. 1, pp. 127–140, Jan. 1992.

"*Adaptive Processing Array Systems*", William F. Gabriel, Life Fellow, *Proceedings of the IEEE*, vol. 80, No. 1, pp. 152–162, Jan. 1992.

"*An Adaptive Array for Mobile Communication Systems*", Sören Anderson et al, *IEEE Transactions on Vehicular Technology*, vol. 40, No. 1, pp. 230–236, Feb. 1991.

"*Analysis of Modified SMI Method for Adaptive Array Weight Control*", Ronald L. Dilsavor et al., *IEEE Transactions on Signal Processing*, vol. 41, No. 2, pp. 721–726, Feb. 1993.

"*Request for Pioneer's Preference*", Filed May 4, 1992 before the Federal Communications Commission, Washington, D.C. 20554, 24 pages, Docket No. 90–314.

Appendix A, "*Appendix to Request of Spatial Communications, Inc. for a Pioneer's Preference in the Licensing Process for Personal Communication Services*", Implementing SDMA in the PCS Environment Technical and Economic Factors; Appendix B, Spatial Communications, Inc. Corporate Resume; and Appendix C, Declaration of Dr. Richard H. Roy.

"*Final Report of Study on Digital Beamforming Networks*", (European Space Agency Contract Report), A. D. Craig et al., British Aerospace (Space Systems) Ltd., Jul. 1990, 28 pages.

"*Requirements of a Mobile Satellite Service*", Timothy M. Abbott, Skylink Corp., USA, pp. 212–215.

"*SDMA Technology Overview and Development Status*", Array Comm., M. Cooper et al., pp. 1–16, Sep., 1992.

GSM Standard, 01.02—Version 3.0.0–1 ETSI/PT12, Released Jan., 1990.

European Standard Search Report re RS 98275 Date of completion of search: Apr. 21, 1997.

D. Filipovic, "*An Azimuthal Omin–Directional Array for Multi–target Acquisition and Tracking*", Proceedings of the Antennas and Propagation Society International Symposium (APSIS), vol. 1, pp. 637–640 (Jul. 20–24, 1992).

*Primary Examiner*—Willis R. Wolfe
*Attorney, Agent, or Firm*—Burns, Doane, Swecker & Mathis, L.L.P.

[57] ABSTRACT

Exemplary embodiments of the present invention describe terminal position location methods and systems. Relative powers of nearby spot beams which are generated by array antennas are determined. For example, powers from six neighboring spot beams relative to a center spot beam within which a mobile station is currently operating, can be measured relative to the power of the center spot beam. Using information from these measurements, the mobile stations position can be determined using, for example, an exponential model of the spot beam pattern.

13 Claims, 5 Drawing Sheets

POSITION DETERMINATION USING MULTIPLE BASE STATION SIGNALS

RELATED APPLICATIONS

This application is a continuation-in-part of U.S. patent application Ser. No. 08/597,073 entitled "Terminal Position Location Using Multiple Beams" filed on Feb. 5, 1996, which application is a continuation-in-part of U.S. patent application Ser. No. 08/179,958 entitled "Position Registration for Cellular Satellite Communication Systems", filed on Jan. 11, 1994, abandoned, and a continuation-in-part of U.S. application Ser. No. 08/179,953, entitled "A Cellular/Satellite Communications System with Improved Frequency Re-Use", which application was also filed on Jan. 11, 1994, now U.S. Pat. No. 5,619,503. Each of the three aforementioned disclosures are expressly incorporated here by reference.

BACKGROUND

The present invention relates to a system for locating terminals in a radio communication system and, more particularly, to the location of terminals in radio communication systems wherein spot beams are used to irradiate geographical regions to provide communication coverage.

One example of radio communication systems employing spot beams can be found in satellite communication systems. Another example is cellular/PCS systems which use fixed-beam phased arrays. To achieve an economically useful capacity to serve a large number of subscribers, communication systems need to allow reuse of the available spectrum many times over the globe. This can be achieved, for example, by the use of multiple spot beam antennas that divide the illumination of the chosen service area between many smaller regions.

The most promising satellite systems for such applications are those which place satellites in a low earth orbit (LEOs), in a medium earth orbit (MEOs) or in a stationary earth orbit (GEOs). Disadvantages of satellites in stationary orbits include the huge antennas that are needed to create the desired size spot beams from the 40,000 km orbit distance and the long delay in signals traversing the orbit distance which creates a problem for two-way conversations. On the other hand, the disadvantage of satellites in low earth orbits is that the satellites move relative to the earth and thus the areas that the spot beams illuminate change as the satellites circle the earth. Medium earth orbiting satellites exhibit the problems of both LEOs and GEOs, although to a lesser degree.

Satellite systems employing low or medium earth orbit satellites need to compensate for the rapidly changing propagation delay in the links between the satellites and terminals on the earth caused by the satellites' movement relative to the earth. During communication in such systems, Doppler compensation is provided to the signals to account for the change in propagation delay. In order to provide Doppler compensation, the terminal can search for the Doppler frequency which is an exhaustive and time consuming process that delays connection to the system. Alternatively, however, given knowledge of the terminal's location, as well as satellite ephemerides information, a Doppler compensation can be calculated instead of searching for the Doppler frequency, thereby speeding up the process of call origination.

Knowledge of the terminal unit's position can also be useful in the provision of many other system functions. For example, handover of a terminal unit between spot beams and channel assignment can be facilitated using knowledge of the terminal's position. Another example is public safety systems and 911 services wherein the ability to locate terminals in emergencies is important. Moreover, as described in the above-identified U.S. Pat. No. 5,619,503, terminal position is also useful in computing the beamforming matrix.

A conventional method for determining a terminal's location is to use information derived from the Global Positioning System (GPS). The GPS includes a number of MEO satellites, each of which transmits a known signal. From any given point on earth, a terminal can receive and measure three or four such signals (because of the large number of GPS satellites in orbit) to determine a time delay and hence a distance between the three or four satellites and the terminal. This information can then be used to triangulate on the terminal's position. Although this technique is reasonably effective in a system in which many different satellites' signals are available to a receiver, other systems, such as GEO satellite systems, do not have this luxury. Accordingly, it would be desirable to provide different methods and systems for obtaining position information for terminals in radiocommunication systems which do not rely on the availability of signals from multiple satellites. One set of such systems and methods are provided in the above-identified pending U.S. patent application Ser. No. 08/597,073 which describes techniques whereby signals generated at a satellite using multiple phased array antenna beams can be used to generate position estimates for a mobile station. However, it would also be desirable to locate mobile stations in systems which provide radio communication using land-based stations as alternatives to (or in conjunction with) satellites.

SUMMARY

According to exemplary embodiments of the present invention, terminal location is accomplished by measuring relative signal strength values of signals received from a plurality of spot beams closest to the terminal for each of a plurality of base stations having phased array antennas. For example, for each base station having phased array antennas, signal strengths from six neighboring spot beams, relative to a center spot beam within which a mobile station is currently operating, can be measured relative to the strength of the center spot beam. Using information from these measurements, the terminal's bearing can be determined using an exponential model of the spot beam pattern. Using bearings from multiple base stations, triangulation techniques can then be used to determine the terminal's position.

According to other exemplary embodiments, the mobile station or terminal can measure the time delay of signals propagating from a satellite and use the information from several such measurements to determine its location. This procedure can be performed, for example, during call set-up or during wake-up periods when the mobile is looking for paging messages.

BRIEF DESCRIPTION OF THE DRAWINGS

These and other features and advantages of the present invention will be readily apparent to one skilled in the art from the following written description, when read in conjunction with the drawings, in which.

DETAILED DESCRIPTION

Figure 1:
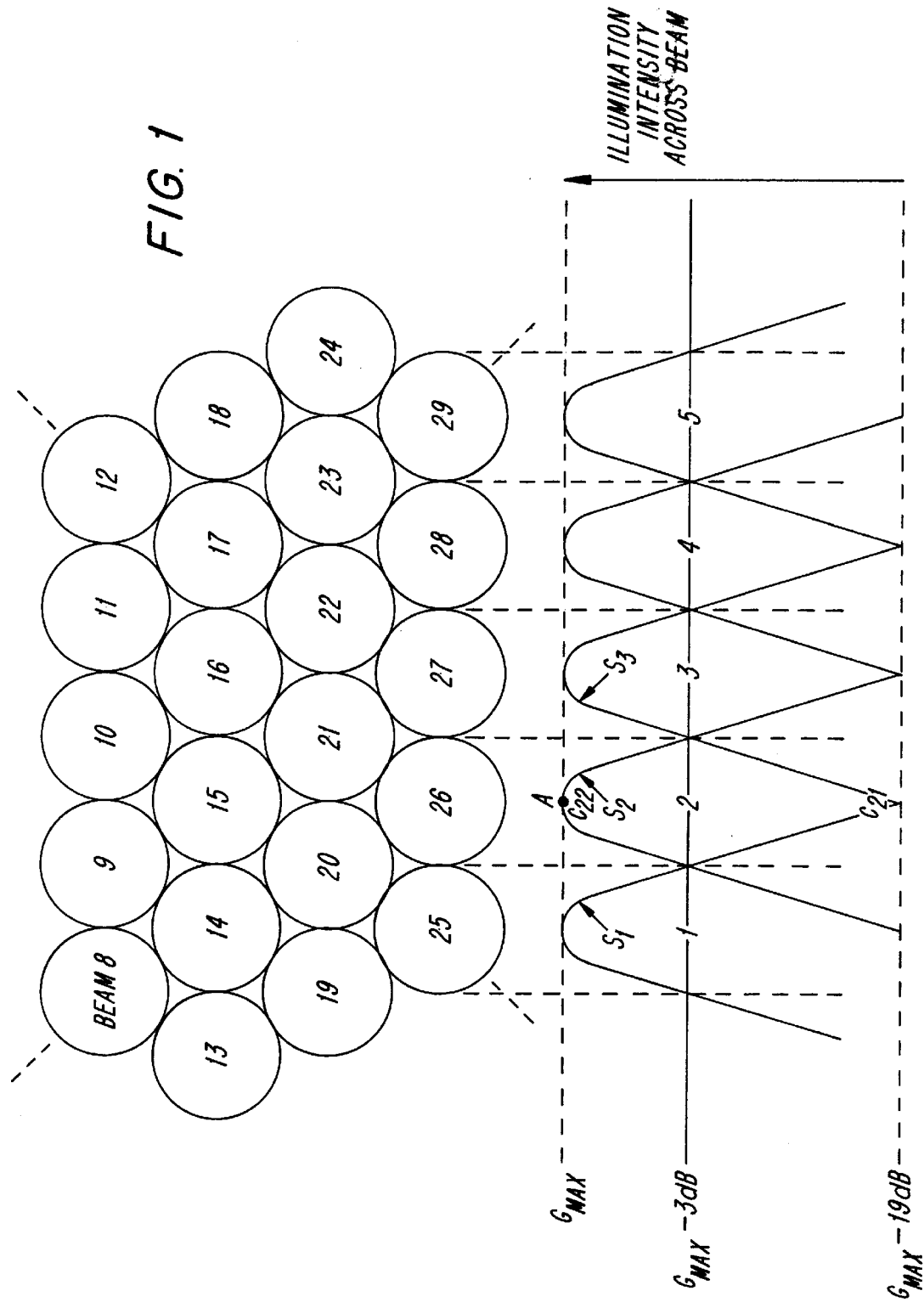
FIG. 1 illustrates an exemplary spot beam illumination pattern.

To begin this discussion of terminal position determination, consider a greatly simplified satellite communication system wherein three communication channels are available. A number of antenna beams, for example 37, could be provided as determined by the fixed physical characteristics of a satellite antenna system, and used to illuminate the earth in so-called spot beam coverage regions. Some of these 37 spot beams are illustrated in FIG. 1. According to conventional wisdom, the gain at the worst point, which lies midway between three spots (e.g., those indicated as corresponding to the beam illumination crossover points in FIG. 1), is maximized by choosing the beam width such that the gain is approximately 3 dB down at the midway point relative to the peak, beam-center gain. This is one exemplary compromise which can be implemented between, on the one hand, reducing the peak gain by broadening the beam so as to reduce the edge loss and, on the other hand, narrowing the beam to increase the peak gain but then suffering a greater beam edge loss the same distance off-center as before. An alternative is disclosed in the aforementioned abandoned U.S. patent application Ser. No. 08/179,958 which describes how channels can advantageously be radiated in slightly different directions so that each point on earth is near a beam center of one channel. In this way the system can be provided with a number of channels from which to choose that are more centrally toward any particular mobile, thus avoiding the beam-edge loss that would otherwise occur.

In either case, a system could employ all of the three frequency channels in every one of the 37 spot beams, with the consequence that a mobile at the midway point between three beams would receive equal overlapping signals on each frequency from all three beams, i.e., two, equal-strength interferers on top of each wanted signal, or this interference problem could be avoided by distributing the frequencies between beams in a 3-cell frequency re-use pattern. In the latter case a mobile at the midway point between three beams would receive all three frequencies at equal strength from the three different surrounding beams, but one frequency only from each beam, with somewhat reduced interference from sidelobes of beams which are further away. A mobile at the midpoint between two beams would receive equal signal strength on two frequencies and somewhat reduced signal strength from two equal signals on the third frequency. A mobile at the center of a beam would receive principally the frequency of that beam with somewhat reduced signal strength on the other two frequencies from the six surrounding beams. Thus, it is possible for a mobile station to roughly determine its position based on the relative received signal strength, e.g., on the three frequencies, as described in more detail in the afore- incorporated by reference abandoned U.S. patent application Ser. No. 08/179,958. The following briefly describes another method for determining location based upon signal strengths received from nearby beams as set forth in more detail in pending U.S. patent application Ser. No. 08/597,073.

The power received by a mobile from each beam depends upon the magnitude of the beam-shape, and the resulting radiation pattern of the beam is determined from a combination of the individual element radiation pattern and the array factor due to beam-forming of the elements. One model that can be used for determining the resulting pattern power loss is an exponential model. If there is enough discrimination from one beam to the next, then the received signal strength measured from the occupied and surrounding beams can be used as measurements of the beam-shape, which can be used to determine the mobile position.

Figure 2:
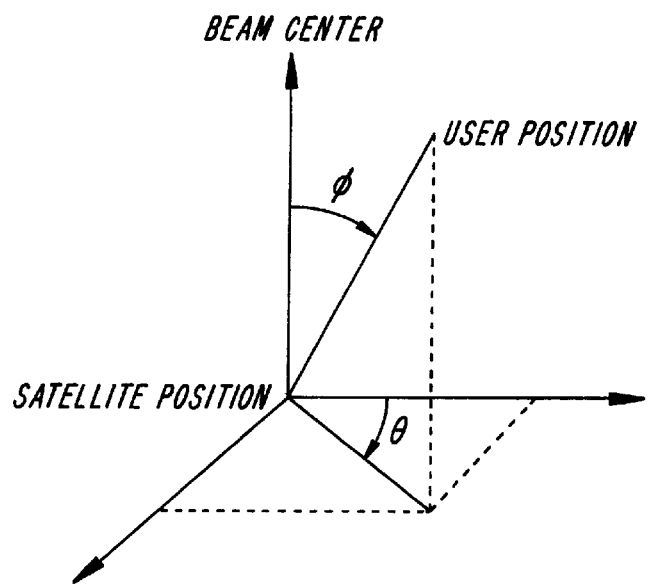
FIG. 2 illustrates exemplary coordinate axes and angles used to identify a terminal position relative to a satellite position.

When the position of the center of the beam is assumed to be known, the problem of estimating the mobile position becomes one of estimating the user position relative to the beam center. Given the known pointing direction of a particular spot beam, the user position can be specified by two angular quantities: the angle away from the beam center angle, $\phi$; and the angle about the ray that extends from the satellite in the direction of the center of the beam, $\theta$. This concept is illustrated in FIG. 2.

Figure 3:
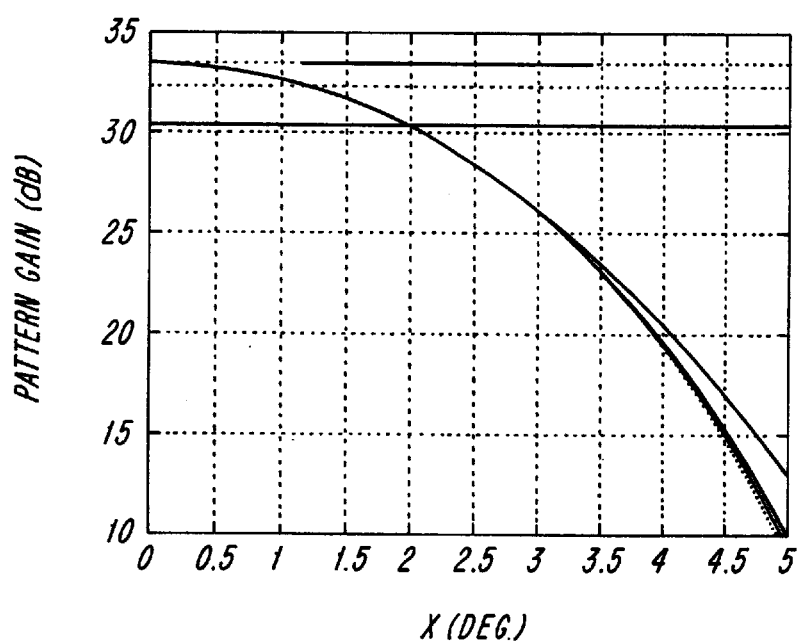
FIG. 3 is a graph illustrating the relative accuracy of exponential beam shape modeling as a function of the angle away from the beam center.
Figure 4:
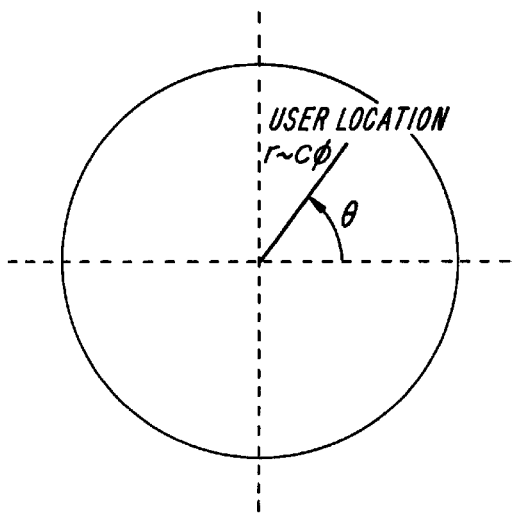
FIG. 4 is a graph which illustrates radial mapping of terminal location.

The beam pattern is a function of both the angles $\phi$ and $\theta$, although the normalized beam shape can be modelled using the exponential equation given by:

$$p(\phi) = e^{-\alpha \phi^2}, \tag{1}$$

where $\alpha$ is chosen to fit the model to the true beam pattern. This model is relatively accurate for small values of $\phi$, usually up to a few degrees. For example, in a 211 element array proposal for the Inmarsat EP21 satellite design, the value of alpha found to approximate the array pattern after beam-forming is 0.1891. A plot of the simulated beam-formed pattern for this system compared with the exponentially modeled pattern is shown in FIG. 3. Therein the modeled pattern is represented by the divergent curve which has higher (y-axis) pattern gain values. It is seen that the exponential model fit is relatively accurate up to about $\phi=3$ degrees where it diverges from the simulated pattern.

In order to estimate the values $\phi$ and $\theta$, the mapping $x = f(\phi, \theta)$ is used (note that vector quantities are represented by bold typeface) and is given by:

$$x = \begin{bmatrix} x(\phi, \theta) \\ y(\phi, \theta) \end{bmatrix} \tag{2}$$

$$= \begin{bmatrix} c\phi \sin(\theta) \\ c\phi \cos(\theta) \end{bmatrix}, \tag{3}$$

where theta is measured from the beam center. Now, to estimate the mobile position, power measurements are taken from signals in the current and six surrounding beams. The power measurements are denoted as $p = [p_0, p_1, p_2, \ldots, p_6]^T$. The model for the measurements from the i'th beam becomes:

$$p_i(x) = A e^{\alpha((x-x_i)^2 + (y-y_i)^2)} \tag{4}$$

$$= A e^{-\alpha |x-x_i|^2}, \tag{5}$$

where $i \in \{0, 1, \ldots, 6\}$ denotes the beam that the measurement is taken from and $x_i$ denotes the location of the center of beam i. Using this model directly to determine mobile position poses a problem, since the absolute power (represented by the scaling factor A in equations (4) and (5)) of the signal may not be known. Thus, according to exemplary embodiments of the present invention, relative measurements of the power from pairs of beams can be used to determine location. For example, the center beam can be used as a reference with respect to which relative power measurements can be determined. These measurements are denoted as $y=[h_1, \ldots, h_6]^T$, where $h_i=p_i/p_0$. Using this approach, the measurement and model becomes:

$$h_i(x) = e^{-\alpha((x-x_i)^2 + (y-y_i)^2)} \cdot e^{\alpha((x-x_0)^2 + (y-y_0)^2)} \quad (6)$$

$$= e^{\alpha(|x-x_i|^2 - |x-x_0|^2)} \quad (7)$$

For example, $h_i(x)$ can be calculated by mobile stations using the RSSI of received time slots from each of the six surrounding beams relative to a time slot received from the center beam, which measurements would then be used in equations (6) and (7). Now, with the measurement model described in equations (6) and (7) above, the estimates of the mobile position can be determined. To estimate the mobile position, the Kalman minimum variance least-squares estimate of x is calculated by finding the point that minimizes the equation $J(x)$ given by:

$$J(x) = (x-\hat{x}_{k|k-1})^T P^{-1}_{x,k|k-1} (x-\hat{x}_{k|k-1}) + (y-h(x))^T R_y^{-1}(y-h(x)) \quad (8)$$

where $\hat{X}_{k|k-1}$ is the estimate of the mobile position, $P_{x,k|k-1}$ is an estimate of the position covariance matrix, and $R_y$ is the assumed known measurement variance. Initial values are chosen for both $\hat{X}_{k|k-1}$ and $P_{x,k|k-1}$. For example, the beam center position can be chosen for $\hat{X}_{k|k-1}$, and for $P_{x,k|k-1}$ the radius of the beam is used as the standard deviation of the initial estimate. For the value of $R_y$, the assumed noise variance is chosen by assuming the worst-case signal to noise values that the technique is supposed to handle, and then choosing the appropriate noise variance of the power measurement corresponding to this signal to noise value. The noise from different beams is assumed to be independent. The function $h(x)$ is given by the equation:

$$h(x) = \begin{bmatrix} h_1(x) \\ h_2(x) \\ \vdots \\ h_6(x) \end{bmatrix} \quad (9)$$

Using this form for the position estimator allows the mobile position to be tracked over time and also produces an estimate of the estimator covariance. The covariance can be useful if the measured power noise variance is also estimated, in which case the estimator covariance can give better information about the accuracy of the estimated results. For example, this covariance provides an indication of the reliability of the position estimate which can be used to more accurately predict beam handover times.

Finding the minimum point for $J(x)$ can be accomplished in a number of different ways. Since the function $h(x)$ is highly non-linear, an extended Kalman filtering approach can be used. Also, because of the non-linearities, the iterated extended Kalman filter approach is preferred. An equivalent form for this estimate is to calculate the Gauss-Newton estimate directly from equation (8) for each update time k. Given an existing estimate at time k, the estimate can be refined by $\hat{x}_k^p$ calculating $\Delta x$ such that $$\hat{x}_k^{p+1} = \hat{x}_k^p + \Delta x, \quad (10)$$

where $\Delta x$ is found by solving the linear equation:

$$P_k^{-1} \Delta x = g \quad (11)$$

The values $P_k$ and g are found using:

$$P_k^{-1} = P_{x,k|k-1}^{-1} + \nabla h^T R_y^{-1} \nabla h, \quad (12)$$

and $$g = P_{x,k|k-1}^{-1}(x-\hat{x}_{k|k-1}) + \nabla h^T R_y^{-1}(y-h(x)). \quad (13)$$

These equations can be iterated until a tolerance is met, or until no more improvement in the estimate occurs. The initial value for x is chosen to be the previous estimate $\hat{x}_{k|k-1} = \hat{x}_{k-1}$, and $P_{x,k|k-1} = P_{x,k-1}$ is used. At time k=1, the previous estimate $\hat{x}_{1|0}$ can be chosen to be the beam center and $P_{x,1|0} = P_{x,0}$ can be chosen to have the radius of the beam center be one standard deviation. In situations that the satellite motion is to be tracked, i.e., when a position determination is calculated over a relatively long time period, then $\hat{x}_{k|k-1}$ and $P_{x,k|k-1}$ can be generated using the appropriate satellite motion models. It should also be noted that output covariance, $P_{x,k-1}$, only needs to be generated (thereby saving an inversion operation) when it is desired to monitor convergence of the output result.

In each iteration the gradient $\nabla h = \nabla_x h(x)$ is calculated at the point of the current estimate $\hat{x}_k^p$. This is given by:

$$\nabla_x h(x) = \begin{bmatrix} \nabla_x h_1(x) \\ \nabla_x h_2(x) \\ \vdots \\ \nabla_x h_6(x) \end{bmatrix}, \quad (14)$$

where the values of $\nabla_x h_i(x)$, i=1,2, ..., 6 are given by:

$$\nabla_x h_i(x) = \begin{bmatrix} \delta h_i / \delta x \\ \delta h_i / \delta y \end{bmatrix} \quad (15)$$

$$= -2\alpha e^{-\alpha((x-x_i)^2 + (y-y_i)^2 + (x-x_0)^2 + (y-y_0)^2)} \begin{bmatrix} (x-x_i) - (x-x_0) \\ (y-y_i) - (y-y_0) \end{bmatrix} \quad (16)$$

$$= -2\alpha(x_i - x_0) e^{-\alpha(|x-x_i|^2 - |x-x_0|^2)}. \quad (17)$$

Using these model equations, the mobile position can now be determined using, e.g., equation (8) along with measurements of received beams' signal strength and the modeled beam pattern.

Figure 5:
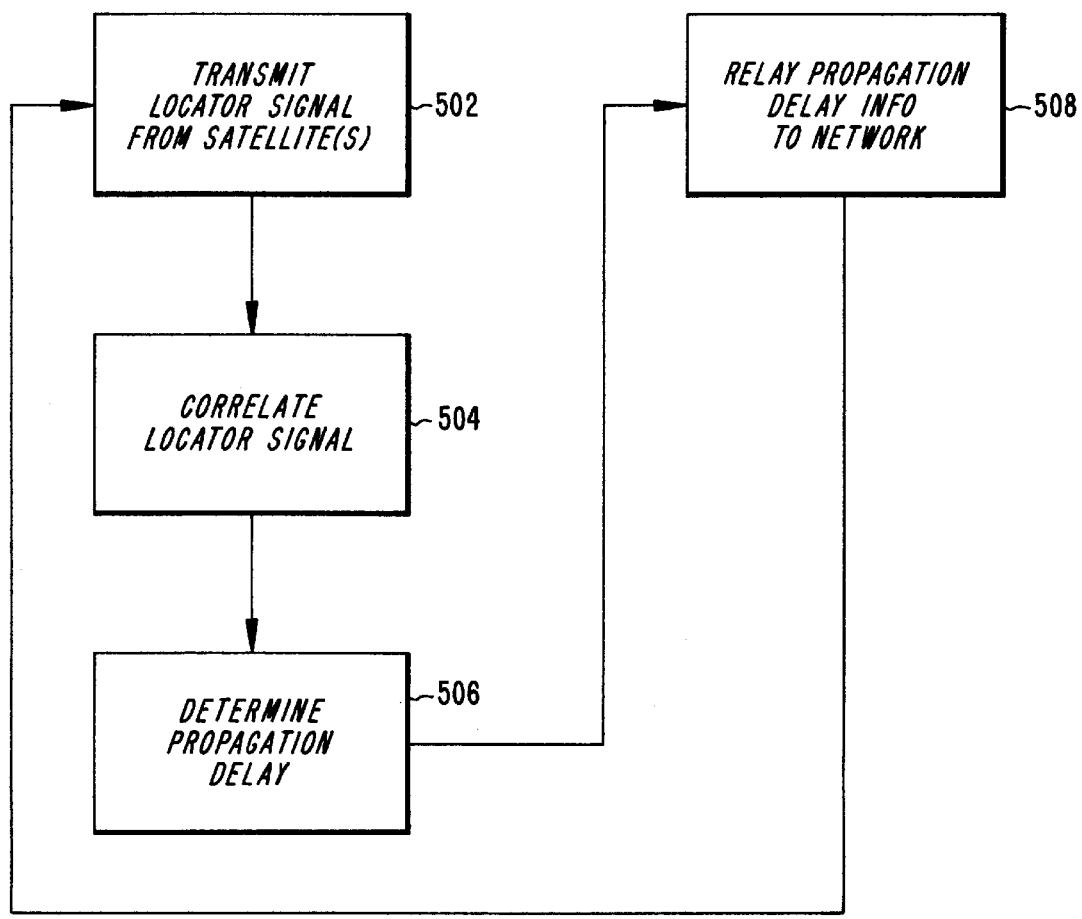
FIG. 5 is a flowchart illustrating a method for locating a terminal according to an exemplary embodiment of the present invention.

According to an exemplary embodiment of the present invention, terminal position location can alternatively be determined by measuring a propagation delay for a signal or signals transmitted from one or more satellites. This exemplary embodiment is illustrated in the flowchart of FIG. 5. For example, each satellite visible to the terminal can transmit a signal including a field having a code with good correlation properties at step 502. The signal can also include the absolute time indicated by a clock onboard the satellite. At the terminal, a correlator is used to locate the known code at step 504. Based on the time of receipt of the correlation peak and the absolute time embedded in the signal, the propagation delay can be determined at step 506. Two or more such propagation delays can be relayed to the network and used to determine the terminal's position given the known ephemerides information of the satellite(s) at step 508. This process can then be performed repeatedly to update the terminal's location.

The delay measurements can, for example, be performed at various traffic times. At call-setup, the satellite(s) will receive an origination message including the terminal's ID information on a random access channel. This provides the satellite(s) with coarse information about the terminal's location, i.e., based upon which array element most strongly receives the terminal's origination message. During the signalling which occurs for call-setup, the terminal can perform the delay measurements described above. For an exemplary system, the origination procedure may be sufficiently long that three to four delay measurements can be made, each spaced apart by about 20 seconds. This information, in conjunction with the beam information, can be used to estimate the position of the mobile station using well known triangulation techniques.

According to another exemplary embodiment, location of the mobile terminal can be performed by taking these delay measurements during "wake up" of the terminal. Periodically, terminals power on in order to listen to a control channel to see if it is being paged to begin a connection. The delay information can then be stored in a memory device of the terminal. A number of such delay measurements can be stored, e.g., four measurements, and these measurements can then be forwarded to the satellite so that the terminal's location can be calculated during call set up or paging.

The aforedescribed exemplary embodiments have been described in terms of satellite radio communications systems, i.e., systems wherein radio coverage is provided by spot beams generated from satellites. However, land based systems wherein base stations have array antennas to illuminate various areas can also be used to implement the present invention. However, since a base station is not elevated from the earth or moving as in the case of satellites, measurements of signals received by a single base station provide an estimate of a terminal's bearing rather than its absolute location. Thus, according to other exemplary embodiments of the present invention, signals received from a terminal by multiple base stations can be used in order to triangulate a terminal's position.

Figure 6:
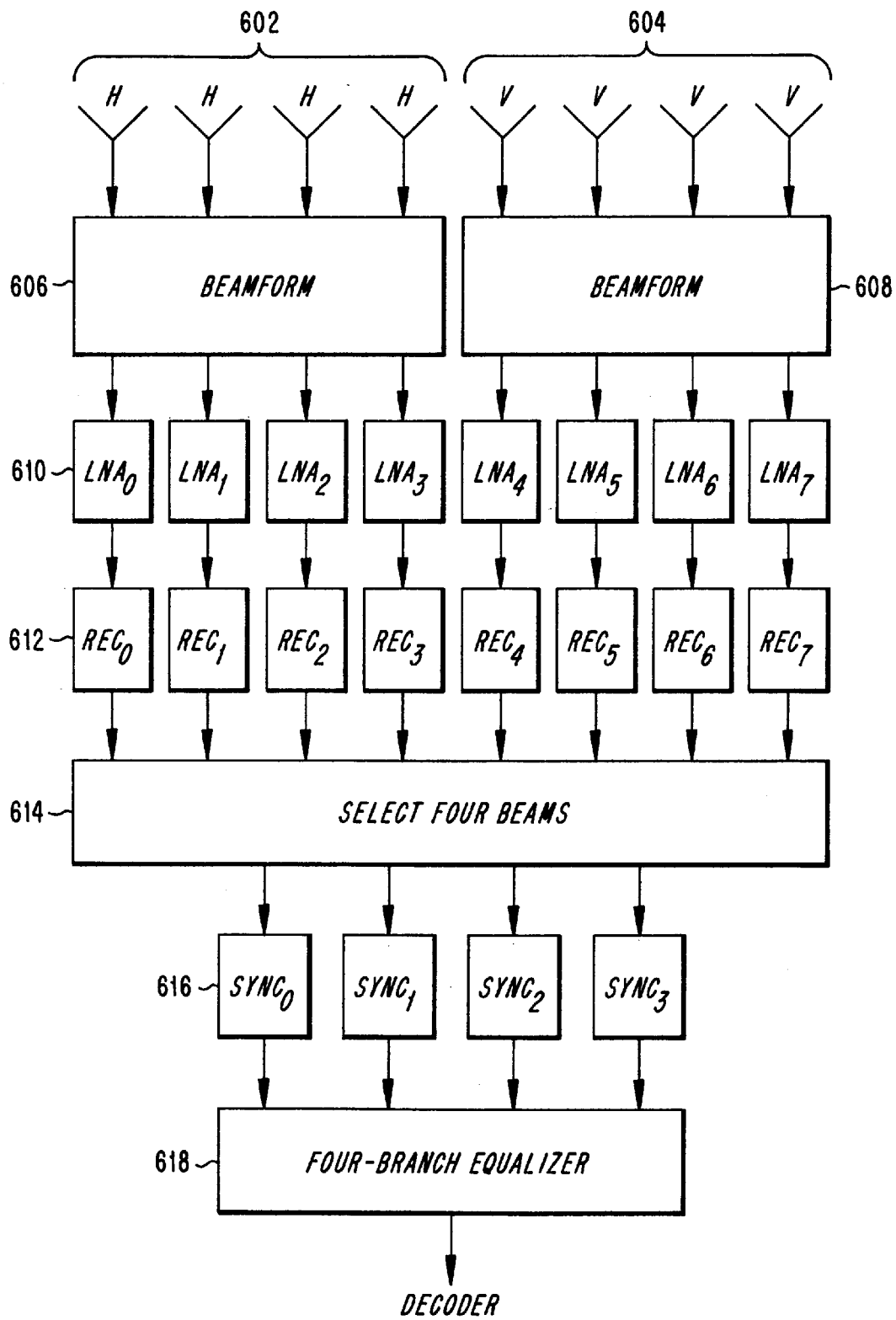
FIG. 6 is a block diagram of an exemplary base station receiver which can be used to implement another exemplary embodiment of the present invention.

Consider, for example, the exemplary base station receiver architecture illustrated in FIG. 6. Therein, a fixed beam phased array antenna system is used in conjunction with various hardware elements to generate multiple beams in fixed angular directions. The phased array antenna system can include a plurality of antenna elements. A first set 602 of which are used to receive signals with horizontal polarization, while a second set of 604 can be adapted for receiving signals with vertical polarization. Alternatively, both sets of antennas could be horizontally or vertically polarized. The signals thus received are processed using beamforming circuitry 606 and 608, respectively. Any conventional beamforming matrix technique can be performed by blocks 606 and 608, e.g., so-called "Butler" matrix operations. The received signals are then further processed by low noise amplifiers 610 and receiving circuitry 612. The receiving circuitry 612 could, for example, be a signal strength measuring device by itself or in combination with a demodulator that demodulates only a portion of the received signal (e.g., the sync word or other known symbols). As described below, the receiving circuitry provided depends upon the information needed to select a desired number of beams. In this exemplary embodiment, four of the eight received beams are selected at block 614 in order of received mobile station signal power. However, those skilled in the art will appreciate that any desired selection technique can be used e.g., selection using signal quality information such as signal power over known sync words or other known information symbols. Synchronization of the signals received in the four selected beams is then performed at block 616 with equalization being subsequently performed by equalizer 618. The information is subsequently decoded and processed according to known techniques.

Figure 7:
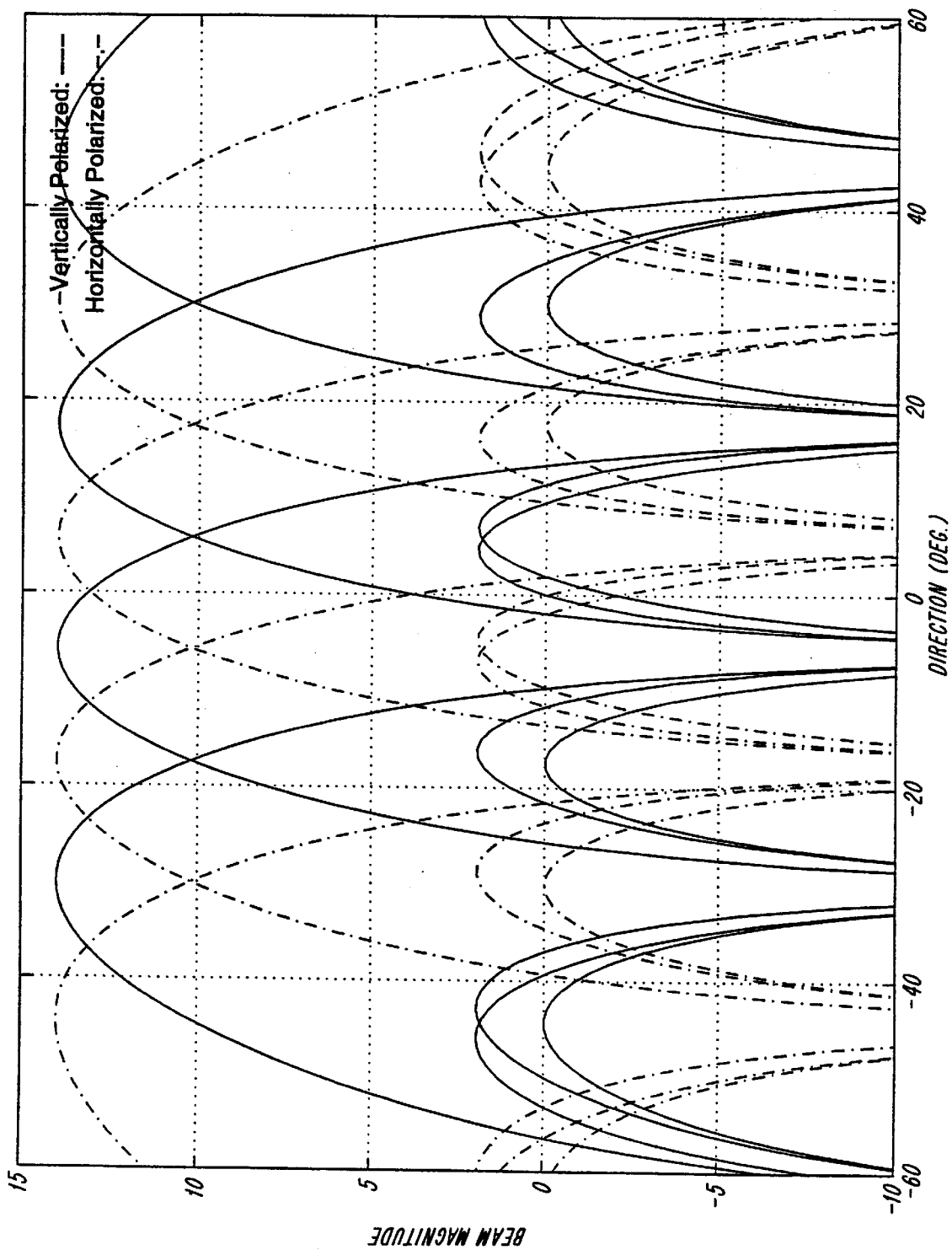
FIG. 7 is a plot of beam magnitude versus direction for the exemplary receiver of FIG. 6.

An exemplary array pattern is shown in FIG. 7, where the array of the receiver architecture of FIG. 6 is used to cover an angular range between −60° and 60°. As can be seen from this figure, a mobile located in a particular direction relative to the receiver of FIG. 6 will be seen on more than one of the beams. Given that a terminal signal will be seen in multiple beams, and if the relative power of these signals is known, then this provides the information needed to determine the angular direction of the terminal using the techniques described above. Thus, at a single base station, a bearing estimate of the mobile position can be made. Assuming that a bearing estimate from a base station to a terminal is obtained for two or more base stations, this information can then be plotted to triangulate the terminal's position. The bearing estimates at each base station could be time-stamped for better accuracy. Alternatively, it can be assumed that the base stations are close enough together so that propagation differences are not significant. Thus, time-stamped direction estimates can be used to form one combined position estimate, with the desired accuracy of the position estimate governing the time interval between measurements being combined. For example, a position estimation accuracy of 150 m might restrict measurements to be combined to those received within a predetermined period of time.

The above exemplary embodiment does not require the base stations involved in the triangulation to be synchronized. However, if synchronized base stations are available, then better position accuracy can be obtained by combining the above-described bearing estimates with the difference in arrival times of those signals used to make the bearing measurements. For example, denote the time difference measurement from two antennas as $T_{12}$. Given a user position X, the expected time difference would be given by a non-linear equation $f_{12}(X)$. Thus, in equation (8) another term could be added:

$$J'(X)=J(X)+(T_{12}-f_{12}(X))^T R_{f_{12}}^{-1}(T_{12}-f_{12}(X))$$

and then similar processing could be done as before, adding extra terms in equations (12) and (13) to account for the time-delay measurements, i.e.

$$\nabla f_{12}^T R_{f_{12}}^{-1}(T_{12}-f_{12}(X))$$

in (13) and $$\nabla f_{12}^T R_{f_{12}}^{-1} \nabla f_{12}$$

in (12).

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A method for locating a terminal in a radiocommunication system using an array to illuminate areas with spot beams, comprising the steps of:

(a) measuring, at a first base station, a received power associated with each of a plurality of said spot beams;

(b) determining relative powers associated with said received power by comparing said relative powers with a reference power; and (c) calculating a first bearing of said terminal relating to said first base station using said relative powers and a model of spot beam shape;

(d) repeating steps (a)–(c) for signals received by a second base station from said terminal to determine a second bearing of said terminal relative to said second base station; and (e) locating said terminal by using said first and second bearings to triangulate said terminal's position.

2. The method of claim 1, wherein said model is an exponential model.

3. The method of claim 1, wherein said first and second base stations are unsynchronized.

4. The method of claim 1, wherein said first and second base stations are synchronized.

5. The method of claim 4, further comprising the step of:
using time of arrival information associated with signals measured in step (a) to improve a position indication obtained from step (e).

6. The method of claim 1, further comprising the steps of:

(f) transmitting a locator signal including a first field having a known value with good correlation properties and a second field having a value indicating a time of transmission of said locator signal to said terminal;

(g) correlating, at said terminal, said locator signal with said known value to identify a time of receipt associated with a peak correlation value;

(h) determining a propagation delay using said value in said second field and said time of receipt; and (i) locating said terminal using said propagation delay in addition to using said first and second bearings in step (e).

7. The method of claim 6, wherein said step of transmitting occurs during setup of a connection between said terminal and a radiocommunication system.

8. The method of claim 6, wherein said step of transmitting occurs during a wakeup period of said terminal while said terminal listens for paging messages.

9. A radiocominunication system including a mobile station and at least two base stations comprising:

a first antenna array associated with a first one of said at least two base stations for providing spot beam radiocommunication coverage of a first area using a first plurality of spot beams;

a second antenna array associated with a second one of said at least two base stations for providing spot beam radiocommunication coverage of a second area using a second plurality of spot beams, said second area at least partially overlapping said first area;

means for measuring, at said first base station, a received power from said mobile station associated with each of said first plurality of said spot beams;

means for measuring, at said second base station, a received power from said mobile station associated with each of said second plurality of said spot beams;

means for determining, based on said measurements at said first base station, a first bearing of said mobile station relative to said first base station;

means for determining, based on said measurements at said second base station, a second bearing of said mobile station relative to said second base station; and means for locating said mobile station using said first and second bearings;

wherein said means for determining said first bearing uses a model of beam shape in addition to said measurements at said first base station.

10. The radiocommunication system of claim 9, wherein said model of beam shape is an exponential model.

11. The radiocommunication system of claim 9, wherein said first and second base station are unsynchronized.

12. The radiocommunication system of claim 9, wherein said first and second base station are synchronized.

13. The radiocommunication system of claim 12, wherein said means for locating also uses time of arrival information to locate said mobile station.

* * * * *